Nov. 8, 1960    A. E. KRACH    2,958,914
SPRING CLIP FOR SECURING SHEETS OF
VARYING THICKNESSES
Filed July 22, 1955

INVENTOR.
ANTHONY E. KRACH
BY
ATTY

United States Patent Office 2,958,914
Patented Nov. 8, 1960

2,958,914

SPRING CLIP FOR SECURING SHEETS OF VARYING THICKNESSES

Anthony E. Krach, Cleveland, Ohio, assignor to The Cuyahoga Spring Company, Cleveland, Ohio, a corporation of Ohio Filed July 22, 1955, Ser. No. 523,807

2 Claims. (Cl. 24—73)

This invention relates to spring clip fastening devices of that type having a portion adapted to be contracted by passing through an aperture in a rigid plate or panel, and having a material engaging portion adapted to press against and hold one or more layers of material to a support.

Assuming a rigid support of sheet metal or the like having a plurality of appropriately positioned apertures therein, the present clips are adapted to pass through registering openings in one or more layers of material, which may be rigid or resilient, as the case may be, and firmly hold different aggregate thicknesses of them by yielding pressure.

The invention is adapted for use in securing trim panel in automobiles, cabinets, and the like, or layers of waterproof material, sound deadening sheets, or two or more superimposed layers of metal with or without interposed, intervening layers of resilient material therein.

The general object of the invention is to provide such a device which may be simple and effective in operation, capable of being removed when desired, and easily inserted into operative holding position.

In the accompanying drawings, the fastening device is shown as made of round wire and capable of engaging and securing sheets or apertured members of relatively widely varying thicknesses with equal effectiveness.

In using such fasteners, it has been customary to provide clips having shapes such that they are most effective when used only with certain thicknesses of supporting apertured members or plates and a given layer of material to be held thereby.

The present invention, however, permits the use of a single type of such clip for holding layers or sheets of different thicknesses, with substantially equal effectiveness and corresponding convenience in assembling, it being unnecessary to select precisely formed clips for a certain thickness of a given plurality of layers.

Other advantages will become apparent from the following description which relates to the accompanying drawings, in which.

Figure 1:
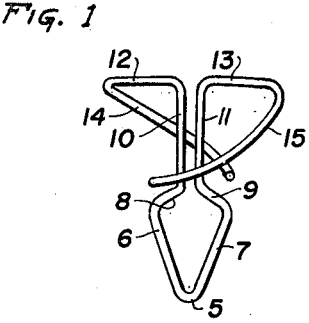
Fig. 1 is a side elevation of this novel spring fastener formed of round wire.
Figure 5:
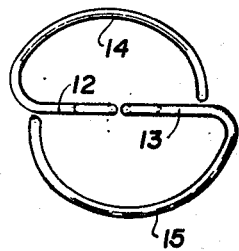
Fig. 5 is a plan view of the clip shown in Fig. 1.
Figure 6:
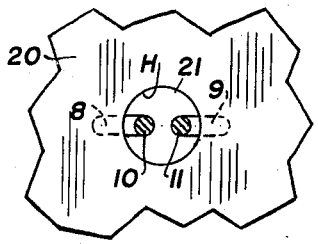
Fig. 6 is a section on an enlarged scale taken at the plane of the apertured sheet shown in Fig. 4.

Referring to Figs. 1 and 6, the spring fastener retaining device there shown comprises a spring member having an aperture engaging loop formed intermediate the spring-acting and holding ends of a single strip of wire. This spring wire member is bent midway between its ends, as at 5, to form the nose of a loop, the sides of which flare outwardly in substantially straight leg members 6 and 7, and then turn inwardly, forming shoulder portions 8 and 9. Substantially straight portions 10 and 11 extend away from the loop in close, approximately parallel but slightly flaring relation. From these portions 10 and 11 the wire is turned outwardly at right angles, as shown at 12 and 13, and then each of these arms is turned inwardly, and toward the loop, forming curved spiral arms 14 and 15, the ends of which normally stand close to the loop, as shown in Fig. 1. These outwardly curved and sloping segments 14 and 15 appear clearly in plan in Fig. 5.

Figure 2:
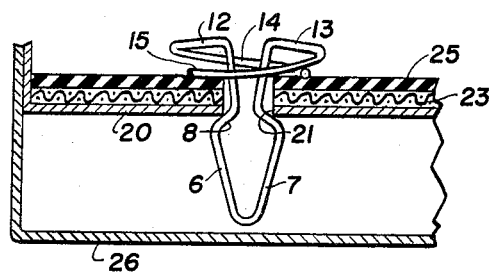
Fig. 2 is a similar view showing the fastener in position, securing a plurality of layers to a rigid apertured support.

Referring to Fig. 2, a plate 20 is shown as having an aperture, as at 21, with which may register corresponding apertures in a plurality of layers, there shown as fabric material 23, and a sheet of rubber or the like 25. This material may be on the inside of a cabinet, trim panel, or door of an automobile, for example, the outer portion of which is indicated at 26.

In such an arrangement, it is to be assumed that the space inside the plate or supporting sheet 20 is not easily accessible. Screw fasteners or fasteners not having a variable gripping action are most difficult to use in such a structure. Whereas, it will be seen that the loop comprising the nose and legs 5, 6, and 7 of this fastener may be readily pushed through the registering apertures and downwardly until the shoulders 8 and 9 spring outwardly at the inner side of the support 20, while the curved arms 14 and 15 have a substantial portion of their ends engaging the inner surface of the sheet 25, and are in a compressed position analogous to that resulting from compressing a spiral spring.

Figure 3:
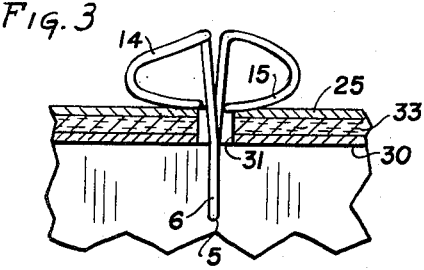
Fig. 3 is a similar view showing a view of the same form of clip taken at right angles to that of Fig. 1, and illustrating it in holding engagement with slightly different layers of material.

In Fig. 3 the support is indicated at 30 as having an aperture 31, and registering apertures of a sheet or layer 33 resting thereagainst may be held by another rigid member, as at 25, while the arms 14 are compressed somewhat less than is required in the thickness illustrated in Fig. 2.

Figure 4:
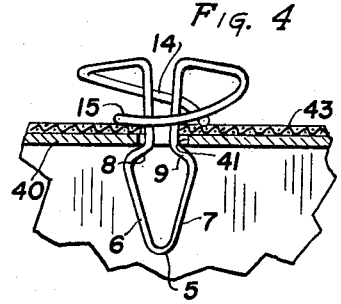
Fig. 4 is a view similar to Fig. 2, showing the fastener in engagement with a single layer, such, for example, as fabric.

In Fig. 4 the support 40 is shown as having an aperture 41 engaged by the shoulders 8 and 9 of the loop, while a single layer 43 of fabric or the like is firmly held by the segmental spiral spring arms 14 and 15, as before.

In Fig. 6, the upwardly extending arm members 10 and 11 are shown in section on a slightly enlarged scale, while the shoulder portions 8 and 9 appear beneath the plate 20 illustrating this fastening, gripping action with the apertured support.

Having thus described my invention, what I claim is:

1. A fastener adapted to engage within an aperture in a rigid support and to simultaneously engage and hold different aggregate thicknesses of material and exert yielding pressure thereon toward the rigid support, the fastener comprising a single piece of round wire bent to form a loop substantially in a plane and having a rounded nose portion and flaring sides and inwardly abruptly sloping shoulders serving to engage the rigid support at the aperture and to locate the fastener in a relatively axially fixed position, and the fastener having straight portions extending away from the shoulders of the loop close to each other and in slightly flaring relation and spaced from the axis of the aperture and extending from the loop shoulders for a distance substantially equal to the height of the loop, and then each of said straight portions being turned outwardly with relation to the axis of the aperture and extending laterally in the plane of the loop, and the ends of the outwardly turned portions being connected with curved spirally sloping segments extending at opposite sides of the plane of the loop and toward the loop and terminating adjacent thereto, and each curved spirally sloping end segment being so positioned as to have its end portion engage the surface of the material to be held with yielding action while the axial distance of each spiral segment is shortened and while exerting torsion on the outwardly extending arm portions.

2. The fastener defined in claim 1 in which the straight arm portions extending through the aperture are of such a length from the shoulders engaging the support at one side of the aperture as to extend a considerable distance away from the opposite side of the support, and said distance being slightly less than the axial distance of the curve of the spirally curved material engaging segments whereby end portions of these segments may engage and hold a thin thickness of material against the support and also may engage thicknesses up to one-half or more of the axial height of the curved arms.

References Cited in the file of this patent

UNITED STATES PATENTS

| | | |
|---|---|---|
| 1,767,745 | Day | June 24, 1930 |
| 2,056,724 | Jackson | Oct. 6, 1930 |
| 2,124,252 | Lavigne | July 19, 1938 |
| 2,139,567 | Van Uum | Dec. 6, 1938 |
| 2,267,512 | Van Uum | Dec. 23, 1941 |
| 2,504,765 | Palmenberg | Apr. 18, 1950 |
| 2,627,099 | Becker | Feb. 3, 1953 |
| 2,692,414 | Poupitch | Oct. 26, 1954 |